United States Patent

Occhipinti

[11] Patent Number: 5,540,406
[45] Date of Patent: Jul. 30, 1996

[54] HYDROFOILS AND AIRFOILS

[76] Inventor: Anthony C. Occhipinti, 1353 Lake Ave. Apt. 5, Metairie, La. 70005

[21] Appl. No.: 507,811

[22] Filed: Jul. 26, 1995

Related U.S. Application Data

[63] Continuation of Ser. No. 140,555, Oct. 25, 1993, abandoned.

[51] Int. Cl.⁶ .................................................. B64C 21/10
[52] U.S. Cl. ........................ 244/200; 244/199; 244/198; 244/201; 244/204
[58] Field of Search .................................... 244/199, 200, 244/204, 198, 201, 130, 209; 416/225 R, 235 R, 236 R

[56] References Cited

U.S. PATENT DOCUMENTS

| | | | |
|---|---|---|---|
| 1,501,248 | 7/1924 | Strong | 244/65 |
| 2,739,770 | 3/1956 | Fanti et al. | 244/200 |
| 3,406,929 | 10/1968 | Young | 244/199 |
| 3,463,418 | 8/1969 | Miksch | 244/199 |
| 3,525,486 | 8/1970 | Wimpenny | 244/199 |
| 3,612,446 | 10/1971 | Lebert | 244/1 N |
| 4,802,642 | 2/1989 | Mangiarotty | 244/200 |
| 5,244,349 | 9/1993 | Wang | 416/231 R |

FOREIGN PATENT DOCUMENTS

| | | | |
|---|---|---|---|
| 164590 | 12/1980 | Japan | 416/231 R |
| 32000 | 2/1990 | Japan | 244/200 |
| 9101247 | 2/1991 | WIPO | 244/200 |

OTHER PUBLICATIONS

Aerodynamics Theories of Drag and Skin Friction; By: Theodore von Karman McGraw-Hill Book Company, Inc., pp. 88-91.
Flying, Mar. 1989, pp. 66, 67.
Machine Design, All This For A Golf Ball; By: James Braham, Senior Editor, Dec. 12, 1991, pp. 121-126.
Fluid-Dynamic Lift, Chapters 2-19, 6-18 and 6-19; By: Dr. Sighard F. Hoerner and H. V. Borst, 1985.

Primary Examiner—Andres Kashnikow
Assistant Examiner—Tien Dinh
Attorney, Agent, or Firm—Llewellyn A. Proctor

[57] ABSTRACT

A low turbulence cambered surface foil, hydrofoil or airfoil, which contains indentations located on maximum camber across which a fluid can be flowed. The indentations create turbulence in the boundary layer downstream of the indentations, changing the characteristics of the flowing fluid to a turbulent boundary layer ahead of the normal point of separation of the fluid from the foil, this causing the fluid to cling close to the surface of the foil and postpone or delay trailing edge separation of the fluid stream from the foil. The noise level is reduced, the performance and efficiency of the foil is improved, or both the noise level is reduced and the performance and efficiency of the foil is improved.

24 Claims, 3 Drawing Sheets

HYDROFOILS AND AIRFOILS

This is a continuation of application Ser. No. 08/140,555, filed Oct. 25, 1993, now abandoned.

SPECIFICATION

1. Field of the Invention

This invention relates to improvements in foils, or solid cambered surfaces which, when the cambered surface is contacted with a fluid, and there is relative movement between the foil and the fluid, noise level is reduced, or performance and efficiency are improved, or both noise level is reduced and performance and efficiency are improved. In particular, it relates to improvements in hydrofoils and airfoils, especially airfoils comprising, e.g., an aircraft surface such as a wing, propeller blade, rudder, strut or the like whose shape and orientation control the stability, direction, lift, thrust, or propulsion of the aircraft.

2. Background

The principles governing the shape and orientation of bodies moved through (or relative to) fluids, both liquids and gases, to provide useful dynamic reactions while well developed are extremely complex. The foil, or foil section, e.g., is known to be the basic element of all lifting devices in fluid, liquids or gases; and the lift- and pitching- moment characteristics of such devices are a function of shape, skin friction and Reynolds number. Airfoils are surfaces with cross-sections designed to develop useful dynamic reactions when relative motion is set up between them and the surrounding air; and, hydrofoils are the equivalent of airfoils in that they are designed to develop useful dynamic reactions when passing through water. Refer, e.g., to *The Elements Of Aerofoil And Aviscrew Theory* by H. Glauert Second Edition, Cambridge at The University Press (1947) at Pages 1–4, and following; *Kent's Mechanical Engineers' Handbook, Power*, Wiley Engineering Handbook Series, New York, John Wiley & Sons, Inc., and London: Chapman & Hall, Limited, Pages 14–100 to 14–103, and following; *Fluid-Dynamic Drag, Practical Information on Aerodynamic Drag And Hydrodynamic Resistance* by Sighard F. Hoerner Dr-Ing., Published by the Author 1965, Page 11–26; and *Fluid Dynamic Lift, Practical Information on Aerodynamic and Hydrodynamic Lift* by Sighard F. Hoerner and Henry V. Borst (Second Edition), Published by Mrs. Liselotte A. Hoerner 1985, Pages 1–2 to 2–4.

With respect to aircraft, e.g., the forces and movements acting on an aircraft are the sum of the forces and movements of its components. Lift, most of which is provided by the wing, balances the weight of the aircraft by overcoming gravity. At the same time, the wing and body usually exhibit unstable movements which tend to cause roll, pitch or yaw. The wings themselves are designed to prevent rolling of the plane about its longitudinal axis. The horizontal stabilizer at the tail of the plane, acting at a considerable distance from the center of gravity, provides a movement which counteracts the pitch. The vertical stabilizer, also at the tail of the plane, helps to keep the plane from yawing. The drag on the aircraft is balanced by engine thrust. The high levels of noise which are a concomitant part of travelling in such aircraft is well known. Moreover, the great number of designs and advances made in the development of aircraft by the developed nations starting at the beginning of this century attest to the continued advancement, and need for improved performance. Noise abatement and improved performance and efficiency remain high priorities in the development and design of hydrofoils and airfoils.

3. Objects

It is, accordingly, a primary object of this invention to fulfill these needs by providing improvements in the cambered surface of a hydrofoil or airfoil which, when the cambered surface is contacted with a fluid between the surface and fluid of which there is relative movement (movement of the foil, or fluid, or both) results in lowered noise level, improved performance and efficiency, or both reduced noise level and improved performance and efficiency.

In particular, it is an object to provide a novel low turbulence cambered surface hydrofoil, e.g., a rudder or propeller, or airfoil, e.g., a wing or propeller, and process for producing said hydrofoil or airfoil, which, when relative motion is set up between the cambered surface and the fluid, e.g., water or air, results in reduced noise level, better performance and improved efficiency, or both reduced noise level and better performance, and improved efficiency.

A further, and yet more particular object is to provide an improved foil device, and process for producing said foil device, useful in aircraft, watercraft, land transport vehicles, automobiles, trucks and trains, windmills, pump machinery, and the like for noise reduction, or improved performance and efficiency, or both reduced noise level and improved performance and efficiency.

A specific object is to provide an airfoil, and process for producing said airfoil, as used to impart and control stability, direction, lift and thrust in aircraft, having characteristics which reduce noise level, or improve performance and efficiency, or both reduce noise level and improve performance and efficiency.

4. The Invention

These objects and others are achieved in accordance with this invention which embodies, in a hydrofoil or airfoil, a solid cambered surface which contains on the surface of maximum camber (i.e., the convexity, or rise in the curve of a foil measured from its chord), a plurality of surface indentations, preferably small diameter openings or pockets which, as motion occurs between the cambered surface and a fluid adds kinetic enery, and thus creates turbulence in the boundary layer downstream of the indentations, changing the flow to a turbulent boundary layer ahead of the normal point of separation of the fluid from the surface of the foil; this causing the layer of flowing fluid to cling close to the surface of the foil thereby postponing, delaying and pushing the location of trailing edge separation closer to the trailing edge of the foil. The result, as this occurs, is that the noise level is reduced, or the performance and efficiency of the foil is increased, or both the noise level is reduced and the performance and efficiency of the foil is increased vis-a-vis a device operated at the same conditions in a similar fluid, with a device having a camber surface of similar structure except that the cambered surface does not contain the surface indentations on maximum camber.

In its preferred aspects, the invention is an airfoil, or foil the surface of which is contoured to react with the air through which it moves, or is moved. Indentations arrayed on the surface of maximum camber creates turbulence in the boundary layer downstream of the indentations, changing the characteristics of the flowing stream of air to a turbulent boundary layer ahead of the normal point of separation of the air from the foil, this causing the airstream to cling to the airfoil surface further downstream of the normal point of separation as contrasted with an airfoil of similar structure operated in air at similar conditions with the exception that it does not contain said indentations.

The characteristics of a preferred device, and its principle of operation, will be more fully understood by reference to the following more detailed description, and to the attached drawings to which reference is made. The various components of the device, an airfoil, are referred to in terms of reference numerals and letters, similar numbers being used in the different figures to designate similar components. In describing certain components, and features thereof, subscripts have been used with whole numbers for convenience to describe subcomponents of a component part.

Figure 1:
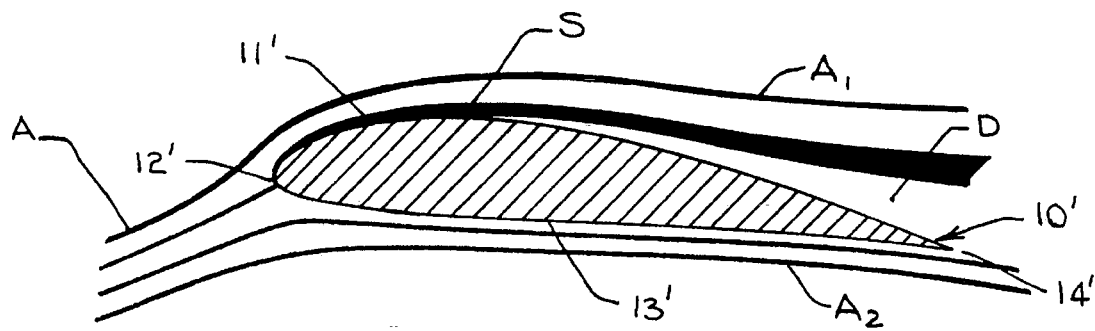
FIG. 1 depicts in cross-section a side elevation view of a conventional airfoil, or airfoil of the prior art.
Figure 2:
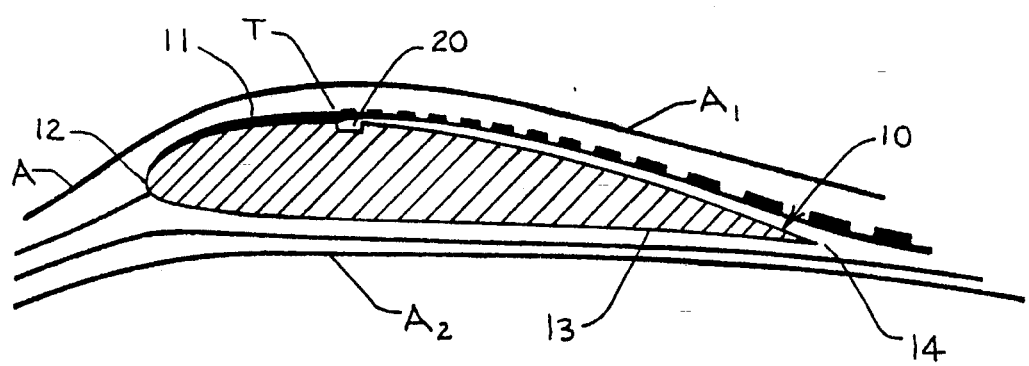
FIG. 2 depicts in cross-section a side elevation view of an airfoil of this invention (which unlike the airfoil of FIG. 1 includes surface indentations on maximum camber), these figures taken together illustrating the flow paths of air in crossing over the two different airfoils.
Figure 3:
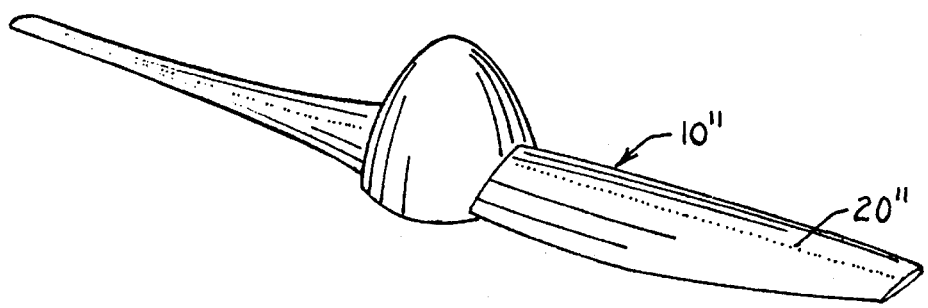
FIG. 3 is a perspective view depicting a specific type of airfoil, notably a propeller, and the placement of indentations on the face of and along the area of maximum camber.
Figure 4:
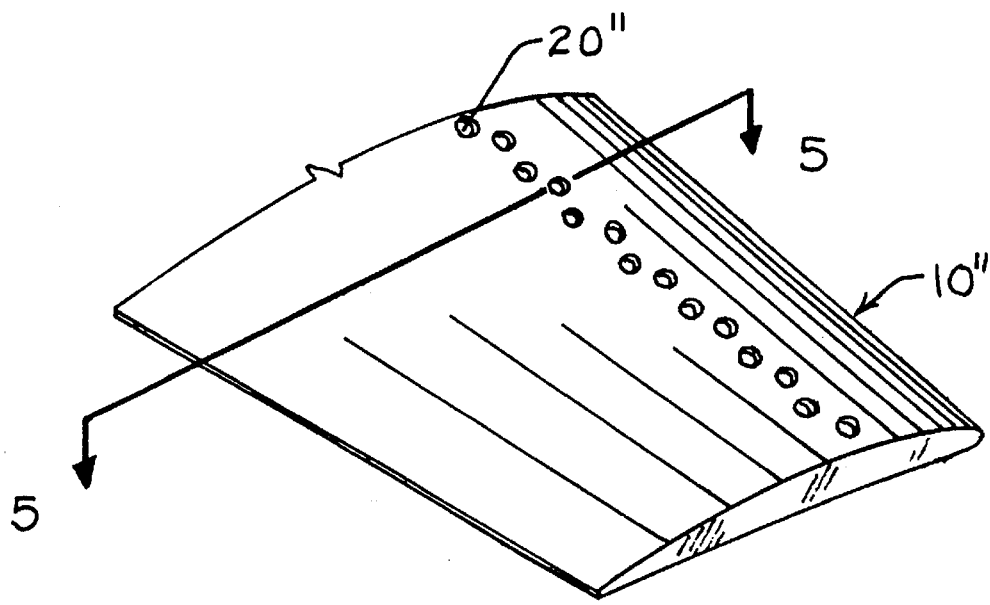
FIG. 4 depicts an enlarged fragmentary, or partial view of an end of a propeller blade of FIG. 3 showing the indentations in better detail.
Figure 5:
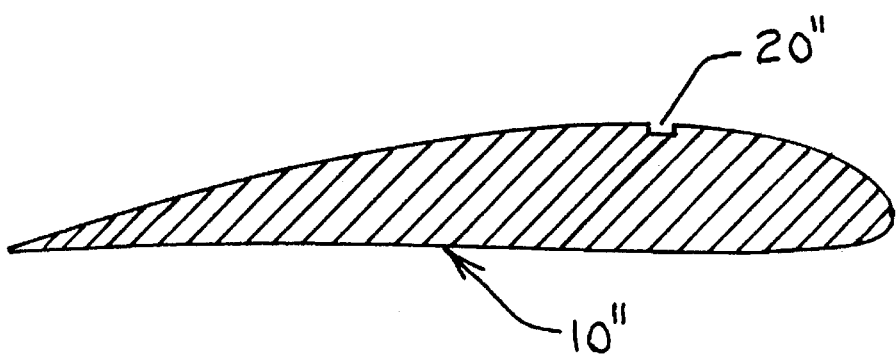
FIG. 5 is a section view taken along lines 5–5 of FIG. 4, this view showing the indentations as extending from the surface of the propeller to locations below the surface.

The propellers and struts described by FIGS. 2 through 7 and 8, respectively, represent airfoils with surface area indentations at, near and on maximum camber. The indentations create low level turbulence constituted of many swirling vortices when the airfoil is contacted by a moving stream of air, the effect of which is to reduce noise level, or to reduce noise level and increase the performance and efficiency of the airfoil vis-a-vis an airfoil of conventional design as represented by reference to FIG. 1. A comparison between the airfoil of FIG. 1, an airfoil of the prior art, and the airfoil of FIG. 2, which is the same as the airfoil of FIG. 1 except for the upper surface indentations, shows the effect of the indentations on the airflow pattern. Referring to FIGS. 1 and 2, respectively, a flowing stream of air, A, contacts the leading edge of an airfoil, splits, one portion of air $A_1$ flowing over the upper surface and another portion $A_2$ over the lower surface of the airfoil, respectively. Referring first to FIG. 1, it will be observed that the stream of air $A_1$ at the upper most forward portion of the airfoil $10^1$ clings to the surface $11^1$ of the airfoil, flowing in laminar fashion over and around the leading edge $12^1$ of the airfoil. The stream of air, in a downstream position on the upper surface of the airfoil, past the point of maximum camber, at location S then detaches and departs from the upper surface $11^1$ of the airfoil. The stream of air $A_2$ passing under the airfoil $10^1$ follows the lower less contoured surface $13^1$ of the airfoil, clinging thereto until it separates from the trailing edge $14^1$ of the airfoil surface. The early separation of the upper stream of air from the airfoil $10^1$ creates a wide zone of dead air D between the two streams of air creating increased drag; and, not surprisingly, much vibration with a high level of noise as the airstream collapses on itself.

Referring now to FIG. 2, the airfoil 10 is provided with upper surface indentations 20 on maximum camber; as provided in the practice of this invention. As discussed in connection with the preceding figure, a stream of air A contacts the leading edge 12 of the airfoil 10 and splits, one portion $A_1$ of air flowing upwardly over the upper surface of the airfoil while the other $A_2$ flows over the lower surface of the airfoil 10, respectively. The flow of air $A_1$ over the top of the airfoil is initially laminar and remains laminar until, on contact with the indentations 20, a low level of turbulence is created; probably by small vortices forming within the indentations. The transition at T to a low level turbulent boundary layer ahead of the normal point of separation S as indicated (and as depicted by reference to FIG. 1) results in the turbulent boundary layer of air clinging to the upper surface 11 of the airfoil, delaying separation from the surface of the airfoil 10 farther downstream of the normal point of separation as depicted by reference to FIG. 1; generally at, or very near the trailing edge 14 of the airfoil 10. The low level turbulence created by the surface indentations 20 thus causes postponement, or movement of the point of separation, S, from the contoured upper surface of the foil rearwardly toward the trailing edge of the airfoil. The zone of dead air between the two streams of air is considerably reduced. As a result noise level is reduced, or both noise level is reduced and better performance and efficiency are obtained without increasing the input energy, or level of energy imparted to the airfoil.

In the practice of this invention, indentations are placed, or located, on maximum camber; a location forward (toward the leading edge) of the normal point of separation of a flowing stream of fluid from a hydrofoil or airfoil. Fluid flowing from the leading edge of a foil thus generally, if not always, flows in laminar fashion until it reaches the point of maximum camber. In normal flow, however, a separation then all too soon occurs; the flowing stream detaching and separating from the surface of the foil (e.g., as represented by point S in FIG. 1). Accordingly, the indentations are placed on maximum camber to create a zone of low level turbulence in advance of the normal point of separation of the fluid from the foil. Thus, on contact of the upper stream of air with the indentations 20, the laminar flow of air transitions to a turbulent boundary layer (e.g., as represented by point T in FIG. 2), with the effect that the stream of air as a whole "sticks upon," or clings to the surface of the airfoil. As a result separation is delayed, and moved rearwardly toward the trailing edge 14 of the airfoil. The indentations 20 are located or arrayed as one or a plurality of rows on a cambered surface at, near or on, and preferably on maximum camber as depicted next, by specific reference to FIGS. 3–5. These figures, particularly FIG. 3, thus show a plurality of indentations $20^{11}$, generally describing a plurality of rows of indentations arrayed at, near and on maximum camber on the upper surface of the propeller blades extending from the hub to the outer terminal ends of each blade, respectively.

The indentations ideally should be placed spanwise along points of maximum camber because separation of a stream flowing over a cambered surface does not generally occur, if at all, prior to reaching the point of maximum camber; and, to achieve the advantages of the invention, the low turbulence area must be created prior to the normal point of separation of the fluid stream from the surface of the foil.

Location of the indentations rearwardly of the normal point of separation of the fluid stream from the surface of the foil thus accomplishes no useful purpose. On the other hand, location of the indentations forward of the point of maximum camber increases directly the resistance of the fluid on the foil as measured by the square of the velocity of the moving fluid, i.e., the "Velocity square" or $V^2$ losses. Thus, the location of indentations forward of maximum camber will offset some of the advantages in performance and efficiency gained by location of the indentations on maximum camber.

A preferred embodiment uses an inverted cylinder indentation covering the spanwise points of maximum camber, with coverage within practical limitations. One or a plurality of rows of indentations can be located at, near or on maximum camber. Generally, indentations of diameter greater than about ⅛ inch provide no advantage over indentations having a diameter of ⅛ inch. Suitably, the diameter of the openings should be no greater than about 3/32 inch. Generally the depth of the hole, or perforations need be no greater than about 0.015 (1/64) inch, and preferably ranges from about 1/64 inch to about 3/32 inch. Preferably, e.g., one or two pairs of rows of the holes, or openings are staggered. The diameter of the indentations may be one-eighth inch, having a depth of one-eighth the diameter, and spaced two diameters between centers.

It has also been found that beneficial results can be obtained via use of a perforated veneer, or perforated veneers, to supply the indentations at, near, or on maximum camber; this, inter alia, permitting the retrofitting of foils made without indentations. Whereas the thickness of the veneer can vary, a thin veneer is preferred to suppress or avoid added drag. Suitably, to avoid significant $V^2$ losses the thickness of the veneer should range between about 1/64 and 3/32 inches; suitably, with holes the depth of which is equal to the thickness of the applied veneer. The absolute size, shape, and spacing of the indentations can vary. The cambered face of the airfoil may be provided with a single row of indentations, or multiple rows on the face along the spanwise points of maximum camber. The shape of the indentations can vary. Suitably, the shape can be circular, with flat bottoms such as an inverted cylinder, curved bottoms, with inclined or parallel walls, rectangular, square, irregular, or combinations. The surface coverage may be more or less evenly spaced, and the centers of the indentations are generally no closer than about two diameters. The depth of the indentations is generally less than the width and no less than about one-eighth the diameter, the diameters of the indentations of the preferred embodiment generally being about one-eighth inch. The indentations cover the spanwise points of maximum camber of the face of a foil, and cambered surfaces.

Attaching the veneer to the camber surface can be accomplished by means of gluing, or by perforating convenient widths of adhesive strips, such as 3-M Number 8671, and then applying the strips to the camber for the desired coverage. Also, a veneer thicker than a 3-M perforated veneer with indentations on the outer surface can be attached to the foil, though generally this is less desirable.

Figure 6:
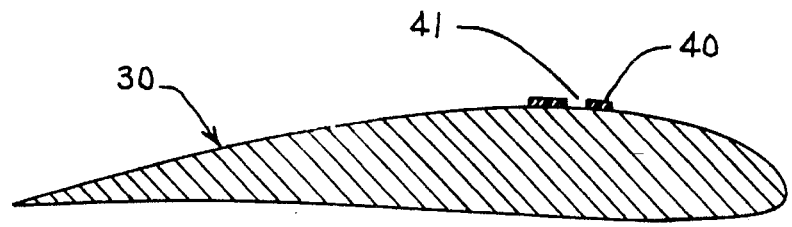
FIG. 6 is a cross section view showing a perforated veneer attached to a propeller surface to provide the indentations at maximum camber.

Referring to FIG. 6, there is shown, in cross-section, a propeller blade 30 on the upper surface, at about the point of maximum camber, of which is affixed a thin perforated veneer, or veneer 40 which contains holes or perforations 41 which extend downwardly from the upper face of the veneer to the surface of the propeller blade. The indentations 41 are on, or arrayed about maximum camber.

Figure 7:
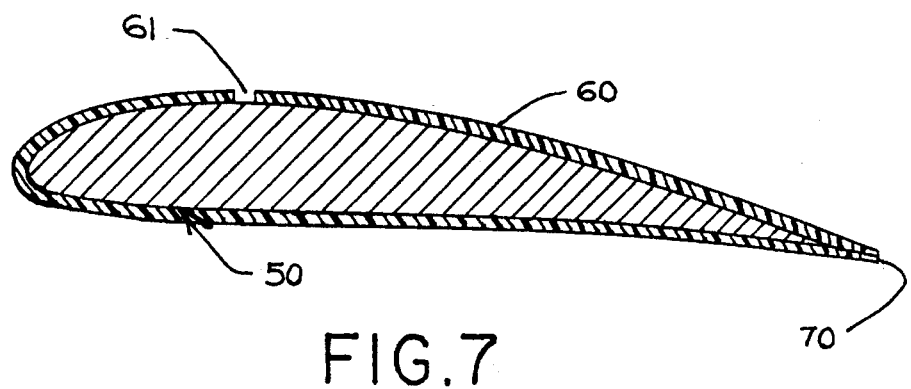
FIG. 7 is a section view showing a perforated veneer, with upper indentations, where the veneer is wrapped completely around and attached to a propeller surface, beginning and terminating at the trailing edge.

FIG. 7 depicts a propeller blade 50 of similar cross-section, though in this instance the veneer 60 covers the entire outer surface thereof, and is provided with holes or perforations at about the location of maximum camber. In other words, the veneer 60 is wrapped completely around the surface of the blade 60, beginning and terminating at the trailing edge 70, to achieve better streamlining and reduce $V^2$ losses.

Figure 8:
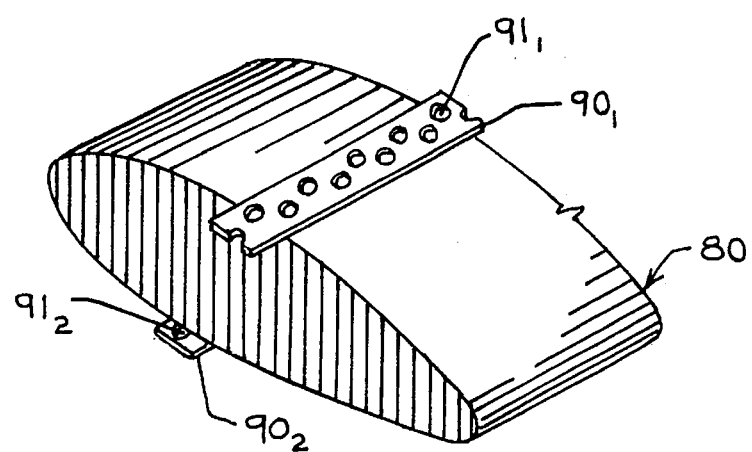
FIG. 8 shows in perspective a partial fragmentary view of a strut airfoil with perforated veneers attached to both cambered faces.

The use of strips of veneer are also shown, and better detailed in FIG. 8. In this figure, both the upper and lower faces of a strut fragment 80 are provided with strips of perforated veneer $90_1$, $90_2$, or veneer $90_1$, $90_2$ with perforations $91_1$, $91_2$.

The following example, and demonstrations, exemplify an airfoil of this invention; comparative data being presented to demonstrate the advantages in noise level reduction, and improved efficiency achieved pursuant to the practice of this invention.

5. Example, And Demonstrations

In the example, and demonstrations of static thrust produced, a two blade 10/6 (10 inches in diameter, and 6 inch pitch) wooden propeller, made by the JZ Zinger Company, was mounted on the shaft of an electrically driven Dremel Moto-Tool, Model 395, rested upon the weighing platform, or pedestal, of a small digital Tranel Health and Diet scale. The electrical input to the Dremel Moto-Tool was supplied by household line voltage and an ammeter was used to measure the input current. A motor control was employed to adjust and control the amperage of the electric current to the tool. The shaft of the motor was faced upwardly, while the base to which the electric line was attached was faced downwardly to rest on the platform of the scale. The propeller in each instance was mounted to rotate in ambient air, at similar conditions, as a pusher prop; i.e., mounted to rotate in a direction to push the motor downwardly against the platform of the scale on which the motor was supported. With the motor, and non-rotating propeller in place, the scale was set to read "zero" grams.

The propeller used to exemplify this invention, and those used for the comparative demonstrations were identical except that the lower surface or cambered side of the propeller used to exemplify this invention (i.e., Example) was provided with a single row of indentations of 1/16 inch diameter. 0.015 inch in depth, and separated one from another by ⅛ inch, on maximum camber only, ranging from the hub to the outer edges of the propeller. On the other hand, the cambered side of the propeller used for the first demonstration (Demonstration One) was smooth, i.e., contained no indentations whatever, and the whole of the cambered side of the propeller used for the second demonstration (Demonstration Two) was provided with indentations of diameter, depth, and separation one hole from another, substantially as used in the propeller exemplifying this invention. The indentations extended from the hub to the outer edges of the two blades, and from the leading edge to the trailing edge of the blades. The non-camber side of the three propellers were smooth, as originally supplied. All surfaces of the third propeller were covered with indentations.

The following describes the resultant effect of several readings obtained in terms of the downward push exerted on the scale in ambient air by each of the three propellers on input of 1.5 amps to the motor.

Demonstration One: The propeller with the smooth upper and lower concave surface which contained indentations provided a downward push approximating 330 grams. The propeller rotated at approximately 1600 revolutions per minute, rpm.

Example: The propeller with the single row of indentations on maximum camber, i.e., the propeller of this invention, provided a downward push approximating 378 grams; a push approximately 14% greater at the same energy level of input than was exerted by the smooth propeller of the first demonstration. Over a number of runs it has also been found that the propeller turns at about 1640 rpm; a gain of about 40 rpm at the same energy input.

Demonstration Two: The propeller with the whole of the upper and lower concave surface containing indentations provided a downward push approximating 336 grams. Location of additional openings toward the leading edge, or in front of the holes on maximum camber, produces $V^2$ losses which reduce efficiency as shown by comparison of this Demonstration Two with Demonstration One and the Example.

Noise level reductions in the use of a propeller as demonstrated by reference to the Example, and the conventional propeller as illustrated by reference to Demonstration One have been found to approximate about six decibels.

The addition of indentations on maximum camber on the propeller, wings, elevators, struts, rudder and other surfaces of an operating aircraft, respectively, has also been found to provide similar advantages. Noise level was reduced and the operating performance and efficiency of the aircraft was improved.

It is apparent that various modifications and changes can be made without departing from the spirit and scope of the present invention. Changes in the absolute or relative dimension of the parts, materials of construction used, and the like will be apparent to those skilled in the art.

Having described the invention, what is claimed is:

1. In apparatus characterized as a foil having cambered surface extending from the leading edge to the trailing edge of said foil, between the cambered surface and a fluid of which relative movement can occur, the improvement which comprises an area completely smooth, without indentations and devoid of projections located between the leading edge of the foil and the area of maximum camber, and a plurality of surface indentations disposed in a row spanwise on maximum camber which is devoid of projections and, except for the presence of said indentations is smooth, and sufficient to produce a low level boundary level turbulence and cause the fluid stream to attach and cling to the cambered surface in the area of said low level turbulence to postpone trailing edge separation of the stream to reduce noise level and improve the performance and efficiency of the foil as contrasted with a foil otherwise similar except that it contains no indentations on maximum camber, or contains indentations or projections, or both, in the area between the leading edge of the foil and maximum camber.

2. The apparatus of claim 1 wherein the foil is a hydrofoil, and the fluid is water.

3. The apparatus of claim 1 wherein the foil is an airfoil, and the fluid is air.

4. The apparatus of claim 3 wherein the airfoil is a wing, propeller blade, rudder, or strut.

5. The apparatus of claim 3 wherein the airfoil is a propeller the blades of which are provided with a plurality of rows of indentations arrayed on maximum camber, the indentations extending from a location where the inner ends of the blades are joined via a hub to the outer terminal ends of the blades.

6. The apparatus of claim 1 wherein the centers of said indentations are no less than about 2 diameters apart.

7. The apparatus of claim 1 wherein the indentations on the cambered surface are of depth ranging from top to bottom from about 1/64 inch to about 3/32 inch.

8. The apparatus of claim 1 wherein the indentations are contained within a thin veneer which is affixed on the cambered surface.

9. The apparatus of claim 8 wherein the indentations are holes which extend through the veneer from one surface thereof to the other, and the veneer ranges in thickness from about 1/64 inch to about 3/32 inch.

10. The apparatus of claim 8 wherein the veneer is attached to the cambered surface by wrapping the veneer around the foil such that openings are positioned spanwise along the points of maximum camber of the surface by wrapping said veneer beginning and ending at the trailing edge of the foil.

11. The apparatus of claim 1 wherein both sides of the foil are cambered.

12. The apparatus of claim 1 wherein both sides of the foil are cambered, and the indentations are provided by application of a thin perforated veneer to the surfaces of the foil.

13. An airfoil having a cambered surface extending from the leading edge to the trailing edge of said airfoil designed to control the stability, direction, lift, thrust or propulsion capabilities of an aircraft moving in air of which said airfoil is a component, the improvement which comprises an area completely smooth, without indentations and devoid of projections located between the leading edge of the foil and the area of maximum camber, and a plurality of surface indentations disposed in a row spanwise on maximum camber which is devoid of projections and, except for the presence of said indentations is smooth, and sufficient to produce a low level boundary level turbulence and cause the stream of air to attach and cling to the cambered surface in the area of said low level turbulence to postpone trailing edge separation of the stream of air to reduce the noise level and improve the performance and efficiency of the airfoil as contrasted with a foil otherwise similar except that it contains no indentations on maximum camber, or contains indentations or projections, or both, in the area between the leading edge of the foil and maximum camber.

14. The apparatus of claim 13 wherein the airfoil is comprised of a propeller the blades of which are provided with a plurality of rows of indentations arrayed on substantially maximum camber, the indentations extending from a location where the inner ends of the blades are joined via a hub to the outer terminal ends of the blades.

15. The apparatus of claim 13 wherein the indentations are contained within a thin veneer which is affixed on the cambered surface.

16. The apparatus of claim 15 wherein the veneer has a thickness no greater than about 0.015 inch through which holes are extended from one surface thereof to the other to form said surface indentations.

17. The apparatus of claim 15 wherein the said veneer is attached to said cambered surface by wrapping said veneer around the said foil such that openings are positioned spanwise along the points of camber of said cambered surface by wrapping said veneer beginning and ending at the trailing edge of the said foil.

18. In a process for producing a foil having a cambered surface extending from the leading edge to the trailing edge of said foil, between the cambered surface and a fluid of which relative movement can occur, the improvement which comprises locating an area completely smooth, without indentations and devoid of projections between the leading edge of the foil and the area of maximum camber, and a plurality of surface indentations disposed in a row spanwise on maximum camber which is devoid of projections and, except for the presence of said indentations is smooth, and sufficient to produce a low level boundary level turbulence which causes the fluid stream to attach and cling to the cambered surface in the area of said low level turbulence to postpone trailing edge separation of the stream to reduce noise level and improve the performance and efficiency of the foil as contrasted with a foil otherwise similar except that it contains no indentations on maximum camber, or contains indentations or projections, or both, in the area between the leading edge of the foil and maximum camber.

19. The process of claim 18 wherein the foil is an airfoil characterized as a wing, propeller blade, rudder, or strut of an aircraft.

20. The process of claim 18 wherein the indentations are contained within a thin veneer which is affixed on the cambered surface.

21. The process of claim 20 wherein the veneer has a thickness ranging from about 1/64 inch to about 3/32 inch through which holes are extended from one surface thereof to the other to form said surface indentations.

22. The process of claim 20 wherein the said veneer is attached to said cambered surface by wrapping said veneer around the said foil such that openings are positioned spanwise along the points of camber of said cambered surface by wrapping said veneer beginning and ending at the trailing edge of the said foil.

23. The apparatus of claim 1 wherein the surface indentations are of circular shape, and the diameter no greater than about 1/8 inch, with said indentations ranging in depth form about 1/64 inch to about 3/32 inch.

24. The apparatus of claim 8 wherein the veneer is one through which holes are extended from one surface thereof to the other to form surface indentations.

* * * * *